US011286582B2

(12) United States Patent
Sjöholm et al.

(10) Patent No.: US 11,286,582 B2
(45) Date of Patent: Mar. 29, 2022

(54) METHOD FOR STABILIZING LIGNIN FIBER FOR FURTHER CONVERSION TO CARBON FIBER

(71) Applicant: RISE Innventia AB, Stockholm (SE)

(72) Inventors: Elisabeth Sjöholm, Märsta (SE); Göran Gellerstedt, Sollentuna (SE); Rickard Drougge, Märsta (SE); Ida Norberg, Sollentuna (SE)

(73) Assignee: RISE INNVENTIA AB, Stockholm (SE)

( * ) Notice: Subject to any disclaimer, the term of this patent is extended or adjusted under 35 U.S.C. 154(b) by 1184 days.

(21) Appl. No.: 14/373,887

(22) PCT Filed: Jan. 21, 2013

(86) PCT No.: PCT/SE2013/050039
§ 371 (c)(1),
(2) Date: Jul. 22, 2014

(87) PCT Pub. No.: WO2013/112100
PCT Pub. Date: Aug. 1, 2013

(65) Prior Publication Data
US 2014/0353861 A1 Dec. 4, 2014

Related U.S. Application Data

(60) Provisional application No. 61/589,645, filed on Jan. 23, 2012.

(30) Foreign Application Priority Data

Jan. 23, 2012 (SE) .................................. 1250041-9

(51) Int. Cl.
| D01F 9/17 | (2006.01) |
| D01D 5/08 | (2006.01) |
| B29C 48/05 | (2019.01) |
| B29C 48/00 | (2019.01) |
| B29C 48/91 | (2019.01) |
| D01D 10/02 | (2006.01) |
| C08H 7/00 | (2011.01) |
| D01F 9/00 | (2006.01) |
| C01B 32/05 | (2017.01) |
| B29C 48/04 | (2019.01) |
| B29K 96/00 | (2006.01) |
| B29K 105/00 | (2006.01) |
| B29L 31/00 | (2006.01) |

(52) U.S. Cl.
CPC .............. *D01F 9/17* (2013.01); *B29C 48/022* (2019.02); *B29C 48/04* (2019.02); *B29C 48/05* (2019.02); *B29C 48/91* (2019.02); *C01B 32/05* (2017.08); *C08H 6/00* (2013.01); *D01D 5/08* (2013.01); *D01D 10/02* (2013.01); *D01F 9/00* (2013.01); *B29K 2096/00* (2013.01); *B29K 2105/0067* (2013.01); *B29L 2031/731* (2013.01)

(58) Field of Classification Search
CPC ........... D01F 9/17; D01F 9/00; B29C 48/022; B29C 48/04; B29C 48/05; B29C 48/91; B29K 2096/00; B29K 2105/0067; B29L 2031/731; C01B 32/05; C08H 6/00; D01D 10/02; D01D 5/08
USPC ................................................. 264/29.2, 29.6
See application file for complete search history.

(56) References Cited

U.S. PATENT DOCUMENTS

| 3,305,315 | A | * | 2/1967 | Bacon | D01F 9/16 |
| | | | | | 252/502 |
| 3,461,082 | A | | 8/1969 | Otani et al. | |
| 3,716,331 | A | * | 2/1973 | Schalamon | D01F 9/16 |
| | | | | | 423/447.5 |
| 3,723,609 | A | * | 3/1973 | Mansmann | D01F 9/21 |
| | | | | | 423/447.1 |
| 5,340,511 | A | | 8/1994 | Morgan et al. | |
| 5,344,921 | A | | 9/1994 | Sudo et al. | |
| 5,843,393 | A | | 12/1998 | Denton, III et al. | |
| 6,103,211 | A | | 8/2000 | Matsuhisa et al. | |
| 2003/0187102 | A1 | | 10/2003 | Medoff et al. | |
| 2011/0274612 | A1 | | 11/2011 | Wohlmann et al. | |
| 2013/0183227 | A1 | * | 7/2013 | Wohlmann | C08H 6/00 |
| | | | | | 423/447.4 |
| 2014/0194603 | A1 | * | 7/2014 | Lehmann | B29D 99/0078 |
| | | | | | 530/502 |

FOREIGN PATENT DOCUMENTS

| CN | 1057241 | A | | 12/1991 | |
| CN | 1113978 | A | | 12/1995 | |
| CN | 1642409 | A | | 7/2005 | |
| CN | 101768799 | A | | 7/2010 | |
| GB | 1 358 164 | | | 6/1974 | |
| GB | 1359769 | | * | 7/1974 | ............... D01D 5/04 |

(Continued)

OTHER PUBLICATIONS

Office Action issued in Chinese Patent Application No. 201380006186. 5, dated Sep. 29, 2015 (English translation only).
Office Action issued in Chinese Patent Application No. 101147115, dated Oct. 25, 2016.
Kubo, S. et al. 1998 "Preparation of carbon fibers from softwood lignin by atmospheric acetic acid pulping" *Carbon*; 36(7-8): 1119-1124.
Lisperguer, J. et al. 2009 "Structure and thermal properties of lignins: Characterization by infrared spectroscopy and differential scanning calorimetry" *Journal of the Chilean Chemical Society* 54(4): 460-463.

(Continued)

*Primary Examiner* — Matthew J Daniels
*Assistant Examiner* — Yunju Kim
(74) *Attorney, Agent, or Firm* — Knobbe, Martens, Olson & Bear, LLP

(57) ABSTRACT

A method for producing a stabilized lignin fiber from softwood alkaline lignin by heat treatment in the absence of oxidant is disclosed. The stabilized lignin fiber can be further treated to obtain carbon fiber.

9 Claims, No Drawings

(56) References Cited

FOREIGN PATENT DOCUMENTS

| | | |
|---|---|---|
| GB | 1 366 131 | 9/1974 |
| JP | 2010-242248 | 10/2010 |
| JP | 2013-519691 A | 5/2013 |
| KR | 2011/0116604 A | 10/2011 |
| TW | 201031692 A1 | 9/2010 |
| WO | WO 2011/097721 A1 | 8/2011 |

OTHER PUBLICATIONS

Supplementary European Search Report in corresponding European application EP 13 74 1067, dated Jul. 30, 2015.
Brodin, Licentiate Thesis. Chemical Properties and Thermal Behaviour of Kraft Lignins, KTH Royal Institute of Technology, Stockholm, Sweden, pp. 1-37 (2009).
Kubo, S. and Jadla, J.F. 2005 "Lignin-based Carbon Fibers: Effect of Synthetic Polymer Blending on Fiber Properties" *Journal of Polymers and the Environment* 13(2): 97-105.
Ruiz-Rosas, R. et al. 2010 "The production of submicron diameter carbon fibers by the electrospinning of lignin" *Carbon* 48(3): 696-705.
Examination Report in corresponding Indian Application No. 6637/DELNP/2014, dated Mar. 28, 2019.

\* cited by examiner

METHOD FOR STABILIZING LIGNIN FIBER FOR FURTHER CONVERSION TO CARBON FIBER

FIELD OF INVENTION

The present invention relates to the manufacture of a stabilized, extruded lignin fiber containing softwood alkaline lignin.

BACKGROUND

Carbon fibers are high-strength light-weight materials commonly produced by heat treatment and pyrolysis of polyacrylonitrile (PAN), a synthetic material made from petroleum feedstock but other precursors are also used to a minor extent such as petroleum- or coal-based pitch and rayon fibres. There are certain drawbacks in the current precursors such as the high price of polyacrylonitrile and its slow carbonization and the uneven quality of pitch. In addition, the two major commercial precursors used are from non-renewable sources.

Structural carbon fiber is herein defined as a solid and homogeneous carbon fiber used as e.g. strength-giving reinforcement elements in construction materials (see Carbon Fiber Application, in the $3^{rd}$ ed. of the book Carbon Fiber, Eds. Donnet, Wang, Rebouillat and Peng, Marcel Dekker 1998, p. 463).

Lignin is present in all vascular plants making it second to cellulose in abundance among polymers in nature. In the pulp and paper industry, large quantities of lignin are produced as a byproduct with primary use as the source of internally generated energy in pulp mills. The kraft process is predominant in the world for liberating cellulosic fibers from wood for further processing to paper, board and tissue products. In the process, lignin becomes dissolved in the alkaline pulping liquor, denoted black liquor, from where it can be further processed to energy by combustion of the partly evaporated black liquor or, alternatively, isolated in solid form by addition of acid.

Alkaline lignins are obtained from black liquors obtained from either kraft or soda pulping. Commercially, these pulping processes are applied on softwoods, hardwoods as well as on annual plant biomass. On pulping, some of the wood polymers, notably lignin and hemicelluloses, are to a major extent chemically modified and solubilized in the black liquor. Among wood species used in alkaline pulping processes major gymnosperm species (softwood) include spruce, pine, larch, hemlock and Douglas fir. Major angiosperm species (hardwood) include birch, aspen, poplar, eucalypt species, acacia, and maple.

In the published literature, it has been suggested that lignin might be an alternative precursor of carbon fiber due to its potentially large availability, its expected lower cost, and its high content of carbon (>60%). In addition, lignin is a renewable material. Two types of carbon fibers have been discerned; solid and homogeneous carbon fibers for construction purposes (herein referred to as structural carbon fibers) and activated porous carbon fibers with large internal pore structure for adsorption of gases and liquids.

In an early attempt to carbonize lignin fibers using lignin originating from woody material, several types of activated carbon fibers suitable for adsorbing products were produced as described in U.S. Pat. No. 3,461,082. Either thiolignin (kraft lignin), alkali lignin (from soda pulping), or calcium lignosulfonate from hardwood and softwood were used and in the examples, fibers produced using wet spinning, dry spinning and melt spinning, are described. Although dry spinning appears to be the preferred mode of fiber production, in Example 5 therein, a mixture of softwood and hardwood thiolignin (1:1 by weight) was used in argon atmosphere at 170° C. to make lignin fiber by melt spinning. After pretreatment in air at 150° C. for 10 hours, the fibers were further heated to 900° C. and activated at that temperature during 1 hour by introduction of air. In further examples, other activating agents such as zinc chloride, sodium hydroxide, or potassium hydroxide were tried.

Fibers from extensively purified hardwood kraft lignin, on the other hand, have been made by extrusion of the lignin either after admixing with softening agents such as poly-ethyleneterephtalate (PET) or poly-ethyleneoxide (PEO) or as such. The resulting lignin fiber has been further converted into carbon fiber through stabilization in air using heating rates of 0.01-2° C./min and carbonization.

In all processes to date for making carbon fiber, the precursor fiber whether being based on PAN, pitch, rayon, lignin or other carboneous source needs a stabilization step able to modify the original fiber to prevent fusing and retain the fibre form during the carbonization step. The stabilization step has been shown to require oxidative conditions employing agents such as oxygen (air), ozone, nitrogen oxide, or sulfur at temperatures about 200-300° C. in combination with long reaction times. Partial stabilization in inert atmosphere in the beginning or later in the process has been described to be effective to increase the production of acrylic, i.e. PAN fibers (U.S. Pat. No. 6,103,211). The oxygen groups of PAN assist in the fusion of the backbone during carbonization and help to eliminate water during aromatization (Bortner, PhD thesis, Virginia Polytechnic Institute and State University, 2003). Thus the oxidative atmosphere cannot be omitted completely. Acrylic fibers consist of at least 85% acrylonitrile monomers with a molecular mass commonly higher than 100,000. In contrast to the non-cyclic PAN polymer, the main constituent of the lignin macromolecule is aromatic and in addition the functional group composition differs between the two molecules. Consequently their reactions and reactivity during stabilization differ.

Since the reactive species is gaseous and the fiber is solid, the effect of stabilization depends on diffusion. The consequence is a heterogeneous reaction across the fiber where the outer surface is more easily oxidized as compared to the interior of the fiber. The skin core structure that is formed during oxidization further slows down the diffusion and thereby increases the time required to achieve stabilization of the fiber.

Hence, there is a need for a faster stabilization step following the manufacture of lignin fibers for further conversion to carbon fibers.

DESCRIPTION OF THE INVENTION

According to a first aspect of the invention, there is provided a method of producing a stabilized lignin fiber comprising the following steps:
a) Providing a fractionated and/or unfractionated softwood alkaline lignin;
b) Optionally purification of the softwood alkaline lignin;
c) Optionally addition of fractionated and/or unfractionated hardwood alkaline lignin to the softwood alkaline lignin;
d) Spinning of the material whereby a lignin fiber is obtained;
e) Stabilization of the lignin fiber under inert conditions.

In one embodiment, the stabilized lignin fiber undergoes carbonization, whereby a structural (homogenous) carbon fiber is obtained. This carbonization may be carried out under inert conditions.

Structural differences exist between softwood and hardwood lignins. Softwood alkaline lignins are much more reactive as compared to alkaline hardwood lignins when exposed to thermal treatment. This difference is in accordance with the invention utilized for stabilization of alkaline lignin fibers at least partly made up of softwood alkaline lignin in the absence of oxidative conditions, whereby short reaction times can be employed; absence of oxidative conditions cannot be used for obtaining a similar stabilization of neat hardwood-based fibers.

Consequently, the material to be spun consists, at least in part, of fractionated softwood alkaline lignin and/or unfractionated softwood alkaline lignin. This part may amount to 10-100% by weight of the material, e.g. 10, 15, 20, 30, 40, 50, 60, 70, 80, 90, 100% by weight, or any interval therein between. In one embodiment, unfractionated softwood alkaline lignin does not by itself constitute more than 98.5% by weight of the material. The balance is constituted by unfractionated hardwood alkali lignin, fractionated hardwood alkali lignin, or a mixture thereof.

Alkaline lignin may be fractionated from black liquor by means of precipitation and involving the following steps; addition of acid to black liquor until lignin precipitation occurs, filtration and re-dispersing the lignin cake in aqueous mineral acid, filtration, washing with water, and drying. In a preferred mode of lignin isolation the procedure described in EP 1,794,363 is applied.

Advantageously, the fractionation can be done according to the principle of ultra filtration as described below. Fractionation, which includes purification, is preferably carried out by way of filtration of black liquor, inert at the conditions present, i.e. high alkalinity at high temperatures, with a filter that permits a lignin-rich permeate while high molecular mass lignin, high molecular mass carbohydrates and lignin-carbohydrate complexes, non-lignin residues, and solid particles are left in the retentate. Ultra filtration may be carried out using a membrane with a cut-off value in the interval from 1 to 50 kDa. Ultra filtration has for example been carried out using a ceramic membrane with a cut-off value of 15 kDa according to the manufacturer (Orelis, France). Further permeate treatment may involve addition of acid, filtration of the precipitated alkaline lignin, re-dispersion of the lignin in acidic aqueous solution, washing with water, and drying (a preferred mode is described in EP 1,794,363). Thereby, fractionated softwood alkaline lignin and/or fractionated hardwood alkaline lignin is obtained.

Fractionation was in one embodiment performed by ultra filtration of black liquor at 120° C. using a ceramic membrane with a cut-off value of 15 kDa (see above). A lower temperature may be used, but will increase the viscosity of the black liquor, thereby increasing the filtering resistance. The higher the cut-off value, the lower the filtration resistance. Hence, higher cut-off values may increase the production capacity. A more homogeneous fraction with respect to the size of lignin fragments can be obtained using lower cut-off values than 15 kDa, but this will result in a higher filtering resistance.

When softwood or hardwood alkaline lignin is fractionated, high molecular mass lignin, polysaccharides and other impurities such as solid particles are removed, whereby the resulting lignin has a high purity (e.g. 0.1% carbohydrates; 0.4% ash) and can thus be used without other additives for further processing to carbon fibers.

Alkaline lignins were in one embodiment precipitated by acidification of the fractionated black liquor or the unfractionated black liquor using gaseous carbon dioxide to a pH of ~9. Alternatively, acidification can be done using any other acid to lower pH values in order to increase the yield.

The optional purification of the fractionated alkaline lignin may be performed by washing, ash-reducing ion exchange or fraction-removing extraction. Washing may include suspending precipitated, alkaline lignin in water, followed by acidification, to e.g. pH 2 with e.g. sulfuric acid. Alternatively, the washing can be done at a lower or higher pH, however below the precipitation pH, by suspending precipitated, alkaline lignin in acidified water, and/or in other acid(s) such as hydrochloric acid, formic acid, nitric acid, acetic acid.

Spinning of the material may be dry spinning, wet spinning, electro spinning, and extrusion, such as melt extrusion.

Spinning to obtain a lignin fiber can be carried out using either neat fractionated alkaline softwood lignin or a mixture of unfractionated softwood alkaline lignin and/or unfractionated hardwood alkaline lignin and fractionated alkaline lignin(s). The mixture may consist of 1.5, 5, 10, 20, 30, 40, 50, 60, 70, 80, 90, 100% fractionated alkali lignin, by weight, or any interval created therefrom, with the balance constituting unfractionated softwood or hardwood alkaline lignin. The preferred conditions for extrusion depend on the composition of the lignin material and thereby its thermal properties. Spinning may be melt extrusion.

Melt extrusion of neat fractionated alkaline lignin(s) or, alternatively, of a mixture of fractionated and unfractionated alkaline lignins is performed at a temperature exceeding the glass transition temperature of the obtained lignin material by 20-75° C. As an alternative, the melt extrusion can be performed in a temperature range of 110-250° C. Said melt extrusion may yield a continuous lignin fiber.

In an embodiment with low addition of fractionated hardwood alkaline lignin (1.5 wt %) in relation to unfractionated softwood alkaline lignin, spinning was carried out at 175-215° C.

In other embodiments admixtures of unfractionated softwood alkaline lignin and fractionated hardwood alkaline lignin were used with a spinning temperature in the range of 155-220° C. to form a lignin fiber.

In one embodiment, fractionated softwood alkaline lignin is spun at a temperature in the interval of 155-220° C. In another embodiment, spinning is performed at a temperature of 200° C.

The stabilization of the obtained lignin fiber is made in inert atmosphere such as nitrogen, helium, neon, argon, krypton, and/or xenon. Stabilization aims at inducing thermosetting properties to the lignin, thus preventing fusion of bundles of extruded lignin fibers and enabling them to retain their fiber form.

The applied stabilization conditions like temperature increase, final temperature and isothermal holding time depend on the composition of the lignin material of the fiber.

The stabilization may be performed momentary at a temperature in the interval from 170 to 300° C. Alternatively, a temperature in the interval of 200-280° C., e.g. 200-250° C., may be made use of. In one embodiment of the invention, stabilization of fractionated softwood alkaline lignin fibers was done by heating the lignin fiber in inert atmosphere (e.g. nitrogen) at 250° C. for 30 min. In another embodiment, stabilization of fractionated softwood alkaline lignin fibers was carried momentary out in nitrogen at a temperature in the range of 200-250° C. and with a treatment time of 5-60 min. In further embodiments of the invention, mixtures of unfractionated softwood alkaline lignin fibers and fractionated hardwood alkaline lignin fibers were stabilized in nitrogen, at temperatures and treatment times as above.

The stabilization can be performed at a heating rate from 1 to 200° C. per minute from e.g. ambient temperature up to 250° C. In one embodiment the heating rate is 1-70° C. per minute, from ambient temperature up to 220° C. In another embodiment the heating rate is 4-70° C. per minute, from ambient temperature up to 220° C. In yet another embodiment the heating rate is 10, 20, 30, 40, 50, 60, 70, 80, 90, 100° C. per minute, or any interval therein between, up to a temperature of 220° C. or 250° C. The starting point for the stabilizing heating may be ambient temperature, or the extrusion temperature or any temperature therebetween.

The lignin fiber may be isothermally treated at the maximum temperature from 1 to 60 minutes. Alternatively, the treatment time at the final temperature may be from 10 to 30 minutes.

The lignin fibers formed were found to be solid and homogeneous without cracks and pores, as revealed by analysis with electron microscopy (EM). The fiber diameters were in the range of 20-115 μm.

In one embodiment, the lignin fiber is stabilized and carbonized in a one-step operation. Hence, the subsequent carbonization may also proceed in inert atmosphere, e.g. in the presence of nitrogen. Carbonization may be achieved by increasing the temperature to obtain a final carbon content of >90%. The carbon fiber produced was shown by electron microscopy (EM) analysis to be solid and homogeneous, i.e. structural by definition.

The invention shall now be further described, with reference to the accompanied Examples. The person skilled in the art realizes that various changes of embodiments and examples can be made, without departing from the spirit and scope of the invention.

EXAMPLES

In the following, preparation of the alkaline lignins used is described in Examples 1 to 3. The melt extrusion conditions for obtaining a continuous lignin fiber are described in Examples 4 to 6. Stabilization conditions for the lignin fibers are described in Examples 7-16. The last two examples describe applicable carbonization conditions to obtain a structural carbon fiber.

1. Preparation of Fractionated and Purified Softwood Kraft Lignin

Black liquor, obtained from kraft pulping of a mixture of pine and spruce wood, was subjected to ultra filtration using ceramic membrane (15 kDa) at a temperature of 120° C. The collected permeate was acidified by gaseous carbon dioxide at 70° C. to pH ~9. After filtration, the lignin cake was suspended in water and acidified to pH ~2 with sulfuric acid. Filtration of the lignin followed by washing with water and drying afforded purified softwood kraft lignin with the following characteristics: ash 0.9%, carbohydrates 0.4%, glass transition temperature ($T_g$) 140° C., decomposition temperature ($T_d$) 280° C.

2. Preparation of Softwood Kraft Lignin

Softwood kraft lignin was isolated from black liquor obtained through pulping of a mixture of pine and spruce wood with kraft pulping liquor. The lignin isolation procedure was done following the steps described in EP 1794363. The following characteristics were obtained: Ash 0.9%, carbohydrates 2%, glass transition temperature ($T_g$) 140° C., decomposition temperature ($T_d$) 273° C.

3. Preparation of Fractionated and Purified Hardwood Kraft Lignin

Black liquor, obtained from kraft pulping of a mixture of birch and aspen wood, was subjected to ultra filtration using ceramic membrane (15 kDa) at a temperature of 120° C. The collected permeate was acidified by gaseous carbon dioxide at 60° C. to pH ~9. After filtration, the lignin cake was suspended in water and acidified to pH ~2 with sulfuric acid. Filtration of the lignin followed by washing with water and drying afforded purified hardwood kraft lignin with the following characteristics: ash 0.9%, carbohydrates 0.4%, glass transition temperature ($T_g$) 114° C., decomposition temperature ($T_d$) 274° C.

4. Preparation of Lignin Fiber from Purified Softwood Lignin at 200° C.

Dry purified softwood kraft lignin (7 grams) was prepared as described in Example 1 and introduced in a laboratory extruder kept at 200° C. The lignin was homogenized at that temperature in the extruder by rotating the two screws at a speed of ~25 rpm for at least 10 minutes before extrusion of the lignin fiber through a die of 0.5 mm in diameter. The resulting continuous lignin fiber was collected on a bobbin using a winding speed of 30 m/min.

5. Preparation of Softwood Lignin Fiber Containing 5% Purified Hardwood Lignin at 200° C.

A total of 7 grams of dry kraft lignin from Example 2 and Example 3 were mixed in the proportions 95:5 (by weight) and introduced in a laboratory extruder kept at 200° C. Lignin fibers were produced as described in Example 4.

6. Preparation of Softwood Lignin Fiber Containing 10% Purified Hardwood Lignin at 200° C.

A total of 7 grams of dry kraft lignin from Example 2 and Example 3 were mixed in the proportions 9:1 (by weight) and introduced in a laboratory extruder kept at 200° C. Lignin fibers were produced as described in Example 4.

7. Stabilization of Purified Softwood Kraft Lignin Fibers Using 4° C./min from Ambient Temperature to 250° C., Isothermally Treated for 30 Minutes.

Softwood kraft lignin fibers from Example 4 were placed in a sealed glass tube filled with nitrogen (>99.999%) and thermally stabilized in a temperature controlled oven using a heating rate of 4° C./min from ambient temperature to 250° C., where it was isothermally treated for 30 min.

8. Stabilization of Single Purified Softwood Kraft Lignin Fiber Using 10° C./Min from Ambient Temperature to 250° C., Isothermally Treated for 60 Minutes.

Softwood kraft lignin fibers from Example 4 were stabilized according to Example 7 using a heating rate of 10° C./min from ambient temperature to 250° C., where it was isothermally treated for 60 minutes.

9. Stabilization of Single Purified Softwood Kraft Lignin Fiber Using 70° C./Min from Ambient Temperature to 250° C., Isothermally Treated for 10 Minutes.

Softwood kraft lignin fibers from Example 4 were stabilized according to Example 7 using a heating rate of 70° C./min from ambient temperature to 250° C., where it was isothermally treated for 10 min.

10. Stabilization of Single Purified Softwood Kraft Lignin Fiber Using 70° C./Min from Ambient Temperature to 200° C., Isothermally Treated for 30 Minutes.

Softwood kraft lignin fibers from Example 4 were stabilized according to Example 7 using a heating rate of 70° C./min from ambient temperature to 200° C., where it was isothermally treated for 30 min.

11. Stabilization of Single Purified Softwood Kraft Lignin Fiber Using 70° C./Min from Ambient Temperature to 220° C., Isothermally Treated for 20 Minutes.

Softwood kraft lignin fibers from Example 4 were stabilized according to Example 7 using a heating rate of 70° C./min from ambient temperature to 220° C., where it was isothermally treated for 20 min.

12. Stabilization of Single Softwood Lignin Fiber Containing 5% Purified Hardwood Lignin Using 10° C./Min from Ambient Temperature to 250° C., Where it was Isothermally Treated for 60 Minutes.

Kraft lignin fibers from Example 5 were stabilized according to Example 7 using a heating rate of 10° C./min from ambient temperature to 250° C., where it was isothermally treated for 60 min.

13. Stabilization of Softwood Lignin Fiber Containing 10% Purified Hardwood Lignin Using 1° C./Min from Ambient Temperature to 250° C., Isothermally Treated for 30 Minutes.

Kraft lignin fibers from Example 6 were stabilized according to Example 7 using a heating rate of 1° C./min from ambient temperature to 250° C., where it was isothermally treated for 30 min.

14. Stabilization of Single Softwood Lignin Fiber Containing 10% Purified Hardwood Lignin Using 70° C./Min from Ambient Temperature to 250° C., where it was Isothermally Treated for 10 Minutes.

Kraft lignin fibers from Example 6 were stabilized according to Example 7 using a heating rate of 70° C./min from ambient temperature to 250° C., where it was isothermally treated for 10 min.

15. Stabilization of Single Softwood Lignin Fiber Containing 10% Purified Hardwood Lignin Using 70° C./Min from Ambient Temperature to 200° C., where it was Isothermally Treated for 30 Minutes.

Kraft lignin fibers from Example 6 were stabilized according to Example 7 using a heating rate of 70° C./min from ambient temperature to 200° C., where it was isothermally treated for 30 min.

16. Stabilization of Single Softwood Lignin Fiber Containing 10% Purified Hardwood Lignin Using 70° C./Min from Ambient Temperature to 220° C., where it was Isothermally Treated for 20 Minutes.

Kraft lignin fibers from Example 6 were stabilized according to Example 7 using a heating rate of 70° C./min from ambient temperature to 220° C., where it was isothermally treated for 20 min.

17. Preparation of Carbon Fibers by Carbonization Subsequent to the Stabilization Step.

Stabilized lignin fibers from Example 7-16 were carbonized in nitrogen atmosphere using a tube furnace with a heating rate of 20° C./min from ambient temperature to 250° C. followed by a heating rate of 1° C./min to 600° C. and subsequently 3° C./min to 1000° C. Solid and homogeneous carbon fibers were obtained as revealed by EM analysis. Furthermore, the fibers did not fuse and retained their shape.

18. Preparation of Carbon Fibers when Stabilization and Carbonization of Lignin Fibers Proceed as a One-Step Operation.

Softwood kraft lignin fibers from Example 4 were placed in a ceramic sample holder and placed in a tube furnace filled with nitrogen (>99.999%). The lignin fibres were thermally stabilized and carbonized in a one-step operation using a heating rate of 10° C./min to 250° C. and isothermal for 10 min followed by a heating rate of 3° C./min to 1000° C. Solid and homogeneous carbon fibers were obtained as revealed by EM analysis. Furthermore, the fibers did not fuse and retained their shape.

The invention claimed is:

1. Method of producing a stabilized lignin fiber comprising the following steps:
   a) providing a material consisting of fractionated softwood alkaline lignin and/or unfractionated softwood alkaline lignin in an amount of 10-100% by weight of the material, the balance being constituted by unfractionated hardwood alkali lignin, fractionated hardwood alkali lignin, or a mixture thereof;
   b) spinning the material obtained by step (a), whereby an alkaline lignin fiber is obtained;
   c) stabilizing the alkaline lignin fiber, wherein the complete process of stabilization is performed under inert conditions and entirely in the absence of oxidative conditions, wherein the stabilizing is performed by isothermally treating the alkaline lignin fiber at 220-300° C. for from 1 to 60 minutes, and
   d) carbonizing the stabilized lignin fiber under inert conditions,
   wherein the stabilizing of the alkaline lignin fiber under inert conditions and the carbonizing under inert conditions proceed as a one-step operation.

2. Method according to claim 1, wherein in a) the fractionated softwood alkaline lignin is produced by ultrafiltration.

3. Method according to claim 1, wherein the spinning in b) is melt extrusion and is performed at a temperature exceeding the glass transition temperature of the material by 20-75° C.

4. Method according to claim 1, wherein the inert conditions are provided by the use of any one of nitrogen, helium, neon, argon, krypton, xenon.

5. Method according to claim 1, wherein in c) the stabilizing is performed at a heating rate from 1 to 200° C. per minute from ambient temperature up to 250° C.

6. Method according to claim 5, wherein the stabilizing is performed at a heating rate from 4 to 70° C. per minute from ambient temperature up to 220° C.

7. Method according to claim 6, wherein the lignin fiber is isothermally treated at 220° C. for from 1 to 60 minutes.

8. Method according to claim 5, wherein the lignin fiber is isothermally treated at 250° C. for from 1 to 60 minutes.

9. Method according to claim 1, further comprising purifying the softwood alkaline lignin prior to spinning.

* * * * *